United States Patent
Chatani et al.

(10) Patent No.: US 6,951,395 B2
(45) Date of Patent: Oct. 4, 2005

(54) PROJECTION OPTICAL SYSTEM, PROJECTION TYPE IMAGE DISPLAY APPARATUS, AND IMAGE DISPLAY SYSTEM

(75) Inventors: Sawako Chatani, Port Washington, NY (US); Katsumi Kurematsu, Tokyo (JP); Takayuki Ishii, Tokyo (JP); Toshihiro Sunaga, Tokyo (JP); Yoshiaki Kurioka, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 75 days.

(21) Appl. No.: 10/630,556

(22) Filed: Jul. 30, 2003

(65) Prior Publication Data
US 2004/0027544 A1 Feb. 12, 2004

(30) Foreign Application Priority Data
Jul. 30, 2002 (JP) ......................................... 2002-221771

(51) Int. Cl.$^7$ ............................................. G03B 21/28
(52) U.S. Cl. .......................................................... 353/99
(58) Field of Search ............................. 353/37, 50, 78, 353/99

(56) References Cited

U.S. PATENT DOCUMENTS

| | | | |
|---|---|---|---|
| 2,510,080 A | * 6/1950 | Cuneo ......................... | 353/99 |
| 4,348,187 A | * 9/1982 | Dotsko ........................ | 353/99 |
| 5,825,560 A | 10/1998 | Ogura et al. ................ | 359/822 |
| 5,847,887 A | 12/1998 | Ogura et al. ................ | 359/822 |
| 6,021,004 A | 1/2000 | Sekita et al. ................ | 359/676 |
| 6,166,866 A | 12/2000 | Sekita et al. ................ | 359/729 |
| 6,292,309 B1 | 9/2001 | Sekita et al. ................ | 359/729 |
| 6,366,411 B1 | 4/2002 | Kimura et al. .............. | 359/729 |
| 6,626,541 B2 * | 9/2003 | Sunaga ........................ | 353/99 |
| 2002/0008853 A1 | 1/2002 | Sunaga ........................ | 353/69 |
| 2002/0057421 A1 | 5/2002 | Kurematsu et al. .......... | 353/74 |
| 2002/0105734 A1 | 8/2002 | Kimura et al. .............. | 359/729 |
| 2002/0149854 A1 | 10/2002 | Tanaka et al. .............. | 359/627 |

FOREIGN PATENT DOCUMENTS

| | | |
|---|---|---|
| EP | 1 139 145 A2 | 10/2001 |
| JP | 5-80418 | 4/1993 |
| JP | 5-100312 | 4/1993 |
| JP | 2000-27307 | 1/2000 |
| JP | 2001-215412 | 8/2001 |
| JP | 2001-255462 | 9/2001 |

OTHER PUBLICATIONS

European Search Report, dated Nov. 17, 2003, for EP 03 25 4526.

European Patent Office, Patent Abstracts of Japan for JP 2001–215412 (Aug. 10, 2001).

* cited by examiner

Primary Examiner—Christopher E Mahoney
(74) Attorney, Agent, or Firm—Morgan & Finnegan LLP

(57) ABSTRACT

A projection optical system which has a short projection distance and a compact structure, and allows oblique projection. The projection optical system projects luminous flux from an image forming element for forming an original image onto a projection surface which is oblique to a central principal ray which is a principal ray of luminous flux traveling from the center of the original image to the center of a finally formed image. The system includes a plurality of reflecting surfaces each having a curvature. In addition, the projection optical system satisfies a predetermined expression (1).

19 Claims, 11 Drawing Sheets

PROJECTION OPTICAL SYSTEM, PROJECTION TYPE IMAGE DISPLAY APPARATUS, AND IMAGE DISPLAY SYSTEM

BACKGROUND OF THE INVENTION

1. Field of the Invention

The present invention relates to a projection optical system for use in a projection type image display apparatus such as a projector.

2. Description of the Related Art

Conventionally, various passive-type projectors have been proposed in which an image forming element such as a liquid crystal display panel is illuminated with luminous flux from a light source and modulates the luminous flux into transmitted light or reflected light for displaying an image before the light is enlargingly projected onto a projection surface such as a screen by a projection optical system.

Some of the projection optical systems for use in such projectors allow projection in a direction which is oblique (diagonal) to the screen (hereinafter referred to as "oblique projection") in order to achieve a larger size of a projected image and a smaller thickness of the apparatus at the same time.

For example, Japanese Patent Application Laid-Open No. H05(1993)-100312 proposes the oblique projection by using a wide-angle lens with a wide field angle as a projection optical system, disposing an image forming element and a screen with a displacement from the optical axis of the projection optical system to use marginal portions of the field angle.

In addition, Japanese Patent Application Laid-Open No. H05(1993)-80418 proposes the oblique projection by forming an intermediate image of image light from a light bulb by a first projection optical system and enlargingly projecting the intermediate image onto a screen by a second projection optical system in which the optical axis of each projection optical system is appropriately inclined.

In recent years, especially, projection optical systems which employ an off-axial (non-coaxial) optical system to realize the oblique projection have been proposed.

The off-axial optical system in the projectors means an optical system which, when a central principal ray is defined as light which passes from the center of an original image displayed on the image forming element to the center of an image (a finally formed image) projected onto the screen through the center of a pupil (an aperture stop), includes a curved surface to which the normal line at the intersection of the central principal ray and the surface is not on the optical path of the central principal ray. The reference axis of the off-axial optical system is shaped to have turns.

Since the off-axial optical system allows relatively free bending or routing of the optical path, a smaller optical system is easily formed. The constituent surfaces are typically asymmetric and aspheric, so that sufficient correction of aberration can be made in the oblique projection.

The usefulness thereof is described in Japanese Patent Application Laid-Open No. 2001-255462, Japanese Patent Application Laid-Open No. 2001-215412, Japanese Patent Application Laid-Open No. 2000-027307 and the like.

FIG. 9 shows a projection optical system proposed in Japanese Patent Laid-Open No. 2001-255462. In FIG. 9, L shows an illumination optical system, P shows an image display panel, and K shows a projection optical system which includes a plurality of reflecting surfaces configured by using the off-axial system for guiding light modulated by the image display panel P to a screen S to form an image on the screen S.

FIG. 10 shows a projection optical system proposed in Japanese Patent Application Laid-Open No. 2001-215412. In FIG. 10, P shows an image display panel and S shows a screen. The projection optical system includes a decentered refractive lens unit and an off-axial optical system including a plurality of reflecting surfaces.

To provide a larger projected image in the projector, a conceivable approach is to increase the projection distance or reduce the focal length to provide a wider field angle. Since the projection optical system proposed in Japanese Patent Application Laid-Open No. 2001-255462 shown in FIG. 9 forms an image of a pupil, it has a small focal length.

The position where the pupil image is formed, however, is located between the screen S and one of the reflecting surfaces having a curvature through which luminous flux from the image display panel P to the screen S passes last, so that it is necessary to ensure a sufficient distance from the position of pupil image formation to the screen. As a result, the projection optical system has a long projection distance.

On the other hand, in the projection optical system proposed in Japanese Patent Application Laid-Open No. 2001-215412 shown in FIG. 10, the ratio of the length of the central principal ray traveling from the screen S to the optical surface having an optical power closest to the screen S, to the length of the central principal ray traveling from the screen S to the image display panel P is set in a certain range. This prevents the projection distance and the diameter of an optical element closer to the screen S from increasing unacceptably.

In the range of conditions disclosed in Japanese Patent Application Laid-Open No. 2001-215412, however, it is difficult to sufficiently reduce the diameter of an optical system when the projection optical system enlargingly projects light onto a large screen with a shorter focal length (that is, the projection optical system supports a wider field angle).

The diameter of an optical system tends to increase in the region from the pupil surface to the screen. This is because the region from the image display panel to the pupil surface corresponds to the focal length in which a number of lenses cannot be disposed, so that lenses are placed necessarily between the pupil surface and the screen. In addition, especially, the diameter of an optical system located farthest from the pupil significantly increases. Thus, to prevent a considerable increase in the diameter of an optical system, the distance from the pupil surface to the reflecting surface farthest therefrom needs to be defined.

SUMMARY OF THE INVENTION

It is an object of the present invention to provide a projection optical system which has a short projection distance and a compact structure, and allows oblique projection.

To achieve the object, according to one aspect of the present invention, provided is a projection optical system which projects luminous flux from an image forming element forming an original image onto a projection surface which is oblique to a central principal ray which is a principal ray of luminous flux traveling from the center of the original image to the center of a finally formed image. The projection optical system includes a plurality of reflecting surfaces each having a curvature.

In addition, the following expression is satisfied:

$$0 < (S0 \times |\beta|)/S1 < 8$$

where S0 represents the length of the path of the central principal ray from a pupil surface closest to the projection surface to a final reflecting surface closest to the projection surface of the plurality of reflecting surfaces, S1 represents the length of the path of the central principal ray from the pupil surface to the projection surface, and β represents a magnification in an oblique projection direction (which is a magnification in a plane including the normal line to the projection surface and the central principal ray incident on the projection surface).

According to another aspect of the present invention, provided is a projection optical system which projects luminous flux from an image forming element forming an original image onto a projection surface which is oblique to a central principal ray traveling from the center of the original image to the center of a finally formed image. The projection optical system includes a plurality of reflecting surfaces each having a curvature, and an aperture stop which is disposed at a position closer to the image forming element than to a final reflecting surface closest to the projection surface of the plurality of reflecting surfaces.

An image of the aperture stop is formed (that is, a pupil image forming position is present, or a conjugate plane to the aperture stop is present) between the aperture stop and the final reflecting surface.

These and other characteristics of the projection optical system according to the present invention will be apparent from the following description of specific embodiments with reference to the drawings.

DETAILED DESCRIPTION OF THE PREFERRED EMBODIMENTS

Figure 11:
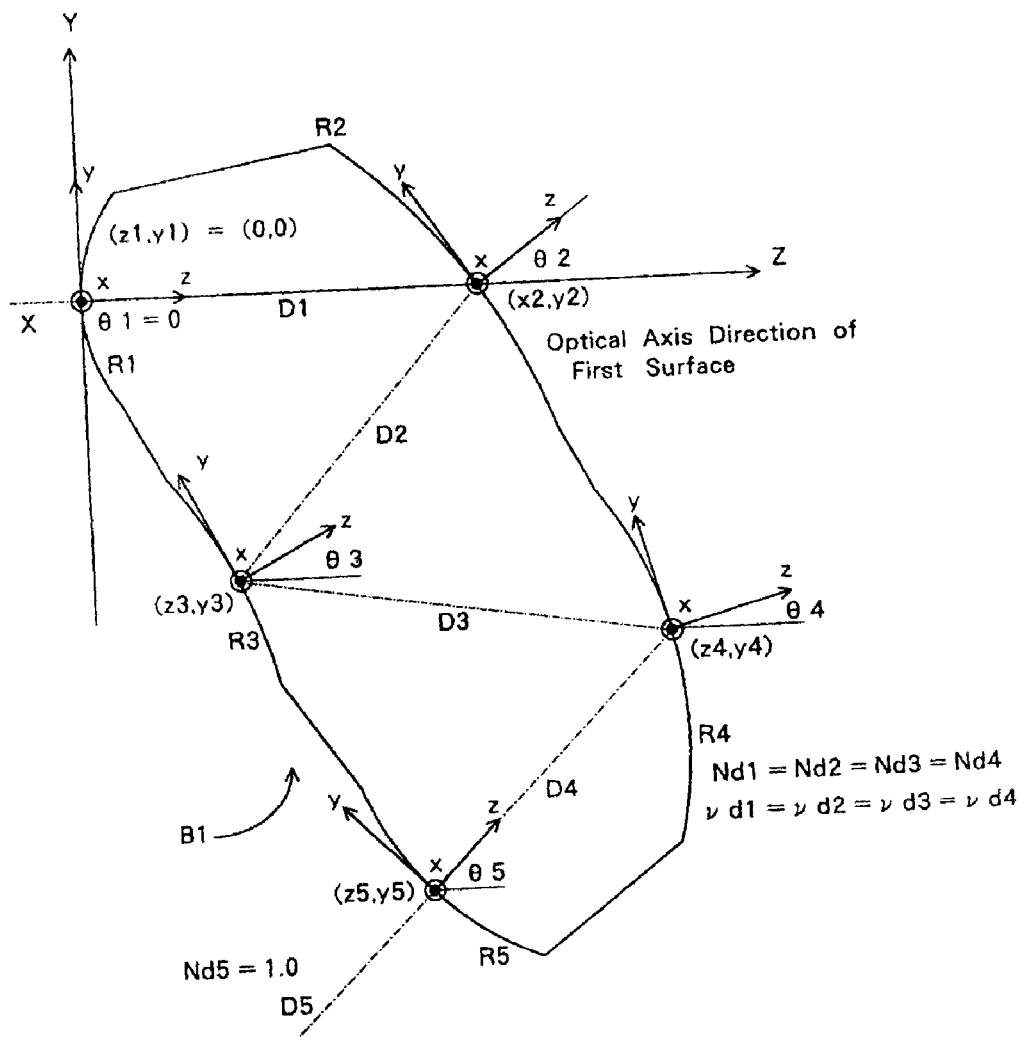
FIG. 11 is an explanatory view of a coordinate system for use in Embodiments 1 and 2 of the present invention.

Prior to description of Embodiments of the present invention, description is made for how to represent features in each Embodiment and matters common to all of Embodiments. FIG. 11 is an explanatory view of a coordinate system for defining data representing optical systems in the present invention. In Embodiments of the present invention, each surface on a light ray traveling from an object side to an image surface (the ray is shown as a dash dotted line in FIG. 11 and referred to as "a central principal ray" or "a reference axis ray") is designated in order with "an i-th surface."

In FIG. 11, a first surface R1 is a refracting surface, a second surface R2 is a reflecting surface tilted with respect to the first surface R1, a third surface R3 and a fourth surface R4 are reflecting surfaces shifted and tilted with respect to their preceding surfaces, and a fifth surface R5 is a refracting surface shifted and tilted with respect to the fourth surface R4. Each of the first surface R1 to the fifth surface R5 is formed on a single optical element made of a medium such as glass and plastic, and the optical element is shown as a first optical element B1 in FIG. 11. In FIG. 11, the medium from an object surface, not shown, to the first surface R1 is made of air, the media from the first surface R1 to the fifth surface R5 are made of a common medium, and the medium from the firth surface R5 to a sixth surface R6, not shown, is made of air.

Since the optical system of the present invention is an off-axial optical system, the respective surfaces constituting the optical system do not have a common optical axis. Thus, in Embodiments of the present invention, an absolute coordinate system is defined such that the center of the first surface R1 is set as its origin. The path of a light ray (a central principal ray or a reference axis ray) passing through the origin which is the center of the first surface R1 and the center of a final imaging surface (finally formed image) is defined as a reference axis of the optical system.

When an original image formed on an image forming element disposed at the object surface is also considered, the reference axis is defined as the path of the principal ray of luminous flux passing through the central of the original image, the center of the pupil of the optical system, and the center of the finally formed image, that is, the central principal ray (or the reference axis ray).

The reference axis in Embodiments has a direction. The direction is the traveling direction of the reference axis ray in forming an image.

While the reference axis serving as the reference of the optical system is defined as described above in Embodiments of the present invention, an convenient axis may be determined as the reference axis serving as the reference of the optical system from the viewpoints of optical design, aberration correction, or representation of the shapes of respective surfaces constituting the optical system. Typically, however, the path of the light ray passing through the center of the image surface and the center of an aperture stop, an entrance pupil, an exit pupil, the first surface of the optical system, or the final surface is defined as the reference axis serving as the reference of the optical system.

In Embodiments of the present invention, the reference axis is set as the path of the central principal ray (reference axis ray) subjected to refraction and reflection by each refracting surface and reflecting surface while the central principal ray emerges from the center of the original image, passes through the center of the first surface and reaches the center of the final imaging surface. The respective surfaces are arranged in the order in which the central principal ray is subjected to the refraction and reflection. Thus, the reference axis finally reaches the center of the image surface after its direction is changed in accordance with the refraction or reflection rule in the set order of the respective surfaces.

All the tilted surfaces of the optical system of Embodiments of the present invention are basically tilted in the same plane. Thus, each axis of the absolute coordinate system is defined as follows.

Z axis: the direction of the normal line to the first surface R1 which is the optical surface closest to the object (the reduced conjugate side, that is, the side closer to a conjugate plane with a small conjugate length) at the point of the first surface R1 at which the central principal ray passes. The direction from the object surface toward the first surface R1 is defined as positive.

Y axis: the direction of a straight line passing through the origin and forming an angle of 90 degrees counterclockwise with respect to the Z axis in the tilt plane (in the sheet of FIG. 11) is defined as positive.

X axis: the direction of a straight line passing through the origin and perpendicular to each of the Z, Y axes (a straight line perpendicular to the sheet of FIG. 11). The direction away from the sheet (the direction rotated about the origin by 90 degrees counterclockwise with respect to the Y axis viewed from the positive direction of the Z axis) is defined as positive.

For representing the shape of an i-th surface of the optical system, it is easier to recognize the shape by setting a local coordinate system in which the intersection of the reference axis (the central principal ray) and the i-th surface is set as its origin and representing the shape of the surface in the local coordinate system, rather than by representing the shape of the surface in the absolute coordinate system. Thus, the shape of the i-th surface is represented in the local coordinate system. In the local coordinate system, x, y, and z axes are defined as follows.

z axis: the direction of the normal line to the i-th surface at the origin of the local coordinate system. The direction forming an angle smaller than 90 degrees with respect to the Z direction of the absolute coordinate system is defined as positive.

y axis: the direction of a straight line passing through the origin of the local coordinate system and rotated by 90 degrees counterclockwise with respect to the z direction in the YZ plane of the absolute coordinate system is defined as positive.

x axis: the direction of a straight line passing through the origin of the local coordinate system and perpendicular to the YZ plane (the direction rotated about the origin by 90 degrees counterclockwise with respect to the y axis viewed from the positive direction of the z axis) is defined as positive.

A tile angle of the i-th surface in the YZ plane is represented by an angle $\theta_i$ (in degrees (°)) when the counterclockwise direction is defined as positive with respect to the Z axis of the absolute coordinate system. The angle $\theta_i$ means the counterclockwise tilt angle of the z axis of the i-th surface in the YZ plane with respect to the Z axis of the absolute coordinate system. In other words, the y and z axes of the local coordinate system (x, y, z) of the i-th surface are inclined by angle $\theta_i$ in the YZ plane with respect to the absolute coordinate system (X, Y, Z). In Embodiments 1 and 2, the origin of the local coordinate system of each surface is on the YZ plane of the absolute coordinate system. In Embodiments 1 and 2, no decentering of the surface exists in the XZ and ZY planes.

In Embodiments 1 and 2, numerical data is shown with section views of the optical systems. In the date, Yi and Zi represent coordinates of the origin of each surface in the absolute coordinate system. $\theta_i$ represents the tilt angle of each surface. Di represents a scalar quantity indicating the spacing between the origins of the local coordinate system of an i-th surface and a (i+1)th surface. Ni, vi represent a refractive index and an Abbe number of the medium between the i-th surface and the (i+1)th surface, respectively. In addition, e-X represents $10^{-x}$.

A spherical surface is a shape represented by the following expression.

$$z = \frac{(x^2+y^2)/Ri}{1+\{1-(x^2+y^2)/Ri^2\}^{\frac{1}{2}}}$$

The optical system of the present invention has at least one aspheric surface which is rotationally asymmetric, and its shape is represented by the following expression:

$z = C02y^2 + C20x^2 + C03y^3 + C21x^2y + C04y^4 + C22x^2y^2 + C40x^4 + C05y^5 + C23x^2Y^3 + C41x^4y + C06y^6 + C24x^2y^4 + C42x^4y^2 + C60x^6$

Since the above expression of the curved surface has only even-numbered order terms for x, the curved surface defined by the above curved surface expression is a plane-symmetric shape which has the yz plane as a plane of symmetry. In addition, a symmetric shape with respect to the xz plane is represented when the following condition is satisfied:

$C03=C21=t=0$

Furthermore, a rotationally symmetric shape is represented when the following is satisfied, or a rotationally asymmetric shape is represented when the following is not satisfied:

$C02=C20$ $C04=C40=C22/2$ $C06=C60=C24/3=C42/3$

Embodiments of the present invention are hereinafter described with reference to the drawings.

(Embodiment 1)

Figure 1:
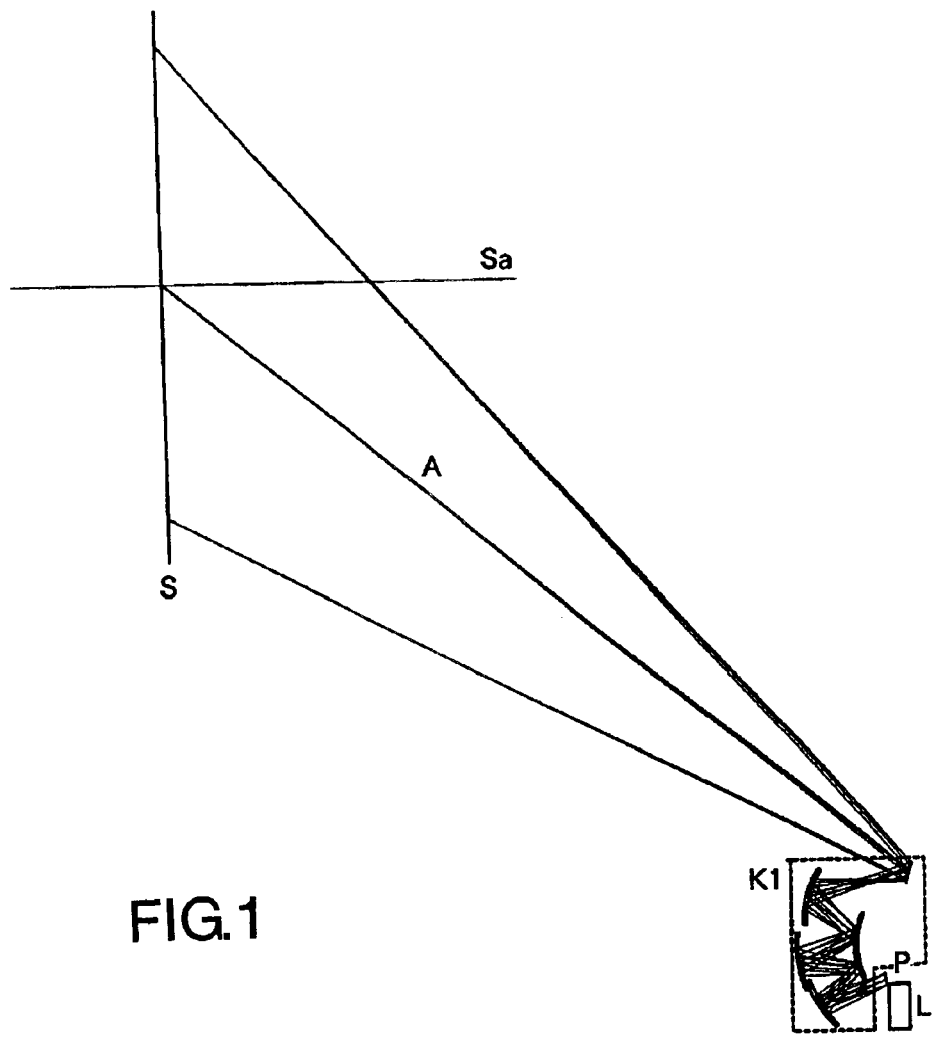
FIG. 1 is a schematic diagram showing the structure of all optical systems of a projector which is Embodiment 1 of the present invention.
Figure 2:
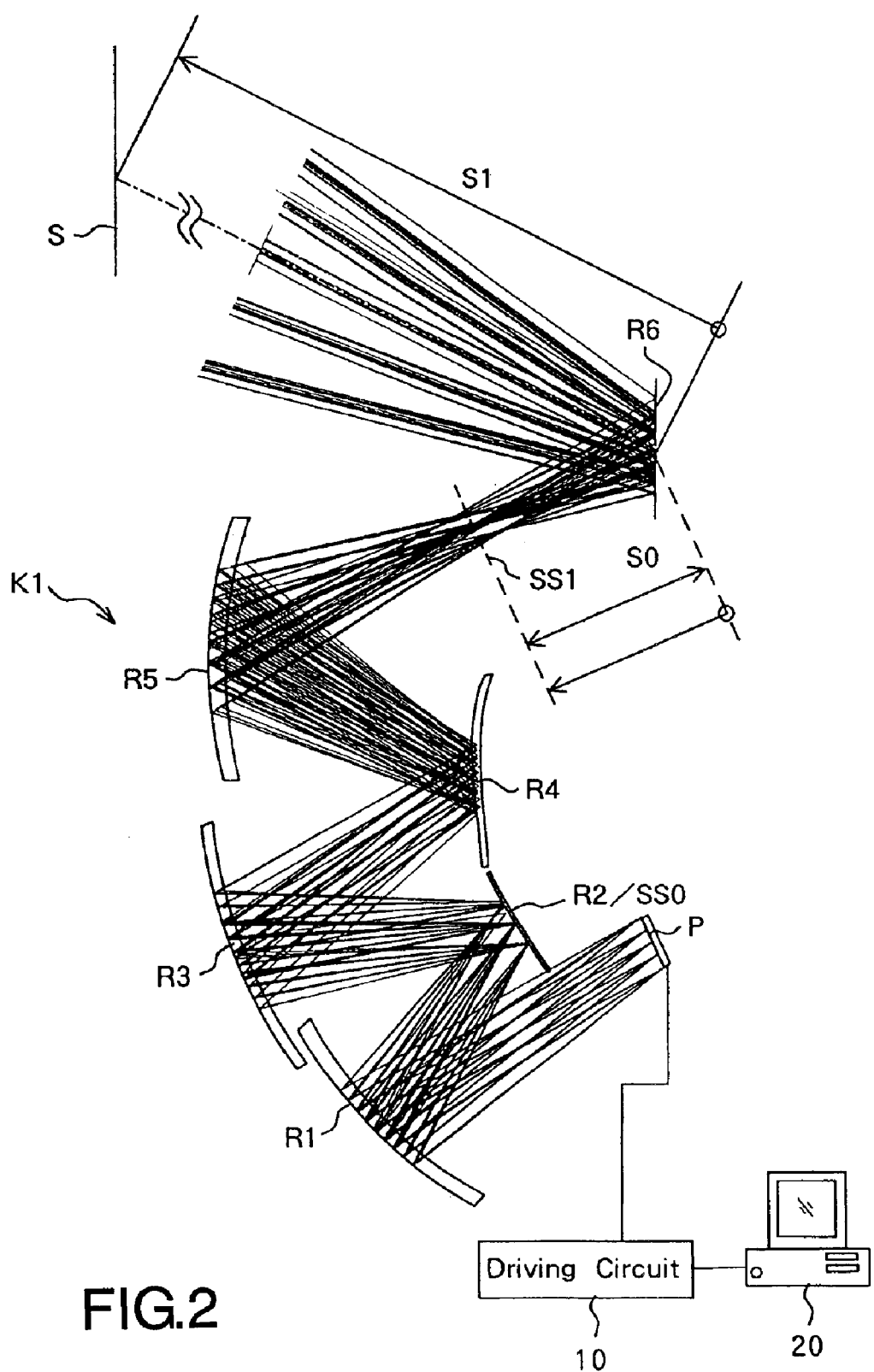
FIG. 2 is a schematic diagram showing the structure of a projection optical system of the optical systems shown in FIG. 1.

FIG. 1 is a schematic diagram showing main portions of all optical systems of a projector (a projection type image display apparatus) which employs a projection optical system serving as Embodiment 1 of the present invention. FIG. 2 is an enlarged view of the projection optical system.

In FIGS. 1 and 2, P shows an image forming element for which a reflective type dot matrix liquid crystal display, a digital micromirror device or the like can be used.

A driver circuit 10 is connected to the image forming element P as shown in FIG. 2. The driving circuit 10 is provided with image information from an image information supply apparatus 20 such as a personal computer, a VCR, a television, a DVD player, a cellular phone, a radio wave receiver (wired or wireless) or the like. The driving circuit 10 drives the image forming element P such that an original image corresponding to the input image information is displayed on the image forming element P. In this manner, an image display system with the projection type image display apparatus is constituted. This structure is also used in Embodiment 2, although not shown.

In FIGS. 1 and 2, L shows an illumination optical system which illuminates the image forming element P. The illumination system L is formed of a lamp, a condenser lens, a filter for selecting a wavelength, or the like.

K1 shows the projection optical system which guides light modulated by the image forming element P to a screen S and forms an image on the screen S. The projection optical system K1 is based on the off-axial optical system.

Next, the projection optical system K1 is described in detail. The projection optical system K1 includes a plurality of rotationally asymmetric reflecting surfaces each having a curvature. In FIGS. 1 and 2, the projection optical system K1 is composed of six reflecting surfaces including a concave mirror R1, a convex mirror R2 (having an aperture stop SS0), a concave mirror R3, a convex mirror R4, a concave mirror R5, and a convex mirror R6, in the order in which rays from the image forming element P pass through. All the reflecting surfaces are symmetrical only with respect to the YZ plane.

The image of the aperture stop SS0 is focused at a position SS1 between the concave mirror R5 and the convex mirror R6. In other words, a pupil surface (that is, an intermediate image of the image forming element P) is formed at a position (hereinafter referred to as "a pupil image forming position") between the aperture stop SS0 and the convex mirror R6 which is an optical surface having a curvature through which the rays traveling from the image forming element P to the screen S pass last.

The concave mirror R5 which is the first reflecting surface from the pupil image forming position SS1 toward the image forming element P has a positive optical power, while the convex mirror R6 which is the first reflecting surface counting from the pupil image forming position SS1 toward the screen S has a negative optical power. This can reduce the distance from the image forming element P to the pupil image forming position SS1 and the distance from the pupil image forming position SS1 to the screen S, so that the projection distance can be more reduced.

In the projection optical system, the following expression (1) is preferably satisfied in order to provide a shorter projection distance and suppress an increase in the diameter of the optical surface closer to the screen S:

$$0 < (S0 \times |\beta|)/S1 < 8 \quad (1)$$

where S0 represents the length of the path of the central principal ray traveling from the pupil surface (pupil image forming position SS1) closest to the convex mirror R6, which is the final reflecting surface of the six reflecting surfaces (R1 to R6), on the side of the image forming element P (that is, the pupil surface closest to a projection surface) to the convex mirror R6, S1 represents the length of the path of the central principal ray traveling from the pupil surface to the screen S, and β represents a magnification in an oblique projection direction (which is a magnification in a plane including the normal line to the projection surface and the central principal ray incident on the projection surface).

The expression (1) defines the distance from the pupil surface to the concave mirror R1 which is the reflecting surface farthest therefrom. Since the length of the region from the image forming element P to the pupil surface (pupil image forming position SS1) corresponds to the focal length of the projection optical system K1 and it is difficult to dispose a number of lenses in the region, the diameter of the optical system tends to increase in the region between the pupil surface (pupil image forming position SS1) to the screen S. Especially, the diameter of the optical surface positioned farthest from the pupil surface toward the image forming element P is significantly increased. Such an increase has a great influence particularly in the optical system having a wide field angle.

Thus, the distance from the pupil surface to the concave mirror R1 farthest therefrom needs to be defined in order to suppress an increase in the diameter of the optical surface positioned farthest from the pupil surface toward the image forming element P.

If the value of $((S0 \times |\beta|)/S1)$ is larger than the upper limit in the expression (1), the diameter of the reflecting surface closer to the screen is larger to cause an increase in cost. On the other hand, if the value is less than the lower limit in the expression (1), that is, when the position of the pupil surface is closer to the screen S than the convex mirror R6 having a curvature through which the rays from the image forming element P to the screen S pass last, then the projection distance is longer, and a reduction in thickness is not effectively provided.

In Embodiment 1, S0 is equal to 46.1, S1 is equal to 1046, and β is equal to 40, and thus the following is obtained:

$$(S0 \times |\beta|)/S1 = 1.76$$

In Embodiment 1, the image forming element P has dimensions of 12.4 mm in the vertical direction and 22.1 mm in the horizontal direction. The screen S has dimensions of 498 mm in the vertical direction and 885 mm in the horizontal direction. The magnification β in the oblique projection direction is 40. A normal line Sa to the screen S is inclined by 40 degrees toward a reference axis A. In the following, data for representing the projection optical system K1 used in Embodiment 1 is shown. In the data, each surface is designated with a number i (i is a positive integer) in the order from the image forming element P to the screen S.

Each of symbols in the data has a meaning described above.

| Object Side Aperture Value 0.08 | | | | | | |
|---|---|---|---|---|---|---|
| I | Yi | Zi | θi | Di | Ni | vi |
| 1 | 0.00 | 0.00 | 0.00 | 56.76 | 1 | reflecting surface |
| 2 | 10.71 | −55.74 | 14.13 | 64.51 | 1 | reflecting surface, aperture stop |
| 3 | 51.42 | −5.70 | 24.13 | 67.59 | 1 | reflecting surface |
| 4 | 40.69 | −72.43 | 41.13 | 68.05 | 1 | reflecting surface |
| 5 | 105.81 | −52.68 | 47.40 | 110.43 | 1 | reflecting surface |
| 6 | 65.03 | −155.30 | 46.68 | 1000.00 | 1 | reflecting surface |
| 7 | 1014.32 | 159.09 | 31.68 | | 1 | image surface |

Aspheric Shape

R1 surface

C02 = −3.85514e−003  C20 = −4.70776e−003
C03 = −6.01477e−006  C21 = 7.63415e−006
C04 = −9.29336e−007  C22 = −6.48743e−007  C40 = −1.65168e−007
C05 = 5.44406e−009   C23 = −1.66977e−008  C41 = −6.26718e−009
C06 = 2.25085e−010   C24 = −3.91876e−010  C42 = −3.90924e−010
C60 = −7.12693e−011

R2 surface

C02 = −2.42541e−003  C20 = −3.78075e−003
C03 = 3.26301e−005   C21 = 5.40437e−005
C04 = −2.24073e−006  C22 = −1.62725e−006  C40 = −2.85399e−007
C05 = 1.82912e−008   C23 = −3.44283e−008  C41 = −3.09964e−008
C06 = −4.01368e−010  C24 = 1.97237e−009   C42 = −1.47562e−009
C60 = −6.47878e−010

R3 surface

C02 = −4.22738e−003  C20 = −4.63587e−003
C03 = 4.78509e−006   C21 = 3.10784e−006

-continued

Aspheric Shape

C04 = −2.12346e−007  C22 = −1.66509e−007  C40 = −6.96903e−008
C05 = −2.10613e−009  C23 = −2.42411e−009  C41 = 6.59704e−010
C06 = 8.31338e−012   C24 = 7.63810e−012   C42 = −4.88019e−011
C60 = 7.52629e−011

R4 surface

C02 = −3.25274e−003  C20 = −8.61030e−003
C03 = −4.95358e−005  C21 = −8.03344e−005
C04 = −1.23822e−006  C22 = 2.09653e−006   C40 = 2.92425e−006
C05 = −2.16840e−007  C23 = 5.06569e−008   C41 = 8.98138e−008
C06 = 6.55391e−010   C24 = 3.77927e−010   C42 = 1.83979e−009
C60 = −2.94289e−009

R5 surface

C02 = −5.07944e−003  C20 = −5.83334e−003
C03 = −2.06964e−005  C21 = −5.25282e−006
C04 = 2.21360e−007   C22 = −5.92065e−008  C40 = −1.47013e−007
C05 = 5.29859e−009   C23 = −6.04296e−009  C41 = −2.78952e−009
C06 = −8.29096e−013  C24 = 2.33718e−011   C42 = 2.57878e−011
C60 = 3.56041e−013

R6 surface

C02 = −7.97556e−004  C20 = −2.17105e−003
C03 = 1.67223e−005   C21 = 8.84246e−005
C04 = −3.29418e−007  C22 = −9.85571e−007  C40 = 1.62308e−006
C05 = −3.24574e−009  C23 = 4.14815e−008   C41 = −1.12141e−007
C06 = −2.55783e−010  C24 = −5.46939e−010  C42 = 3.54399e−010
C60 = 1.27042e−009

Next, optical effects in the projection optical system K1 in Embodiment 1 are described. Light emitting from a light source of the illumination optical system L shown in FIG. 1 passes through a condenser lens, a color filter and the like, not shown, illuminates the image forming element P. The light modulated by the image forming element P travels while it is sequentially reflected by the six reflecting surfaces R1 to R6 constituting the projection optical system K1 as shown in FIG. 2. The light is then guided to the screen S where a projection image is enlargingly projected corresponding to the original image displayed on the image forming element P.

Figure 3:
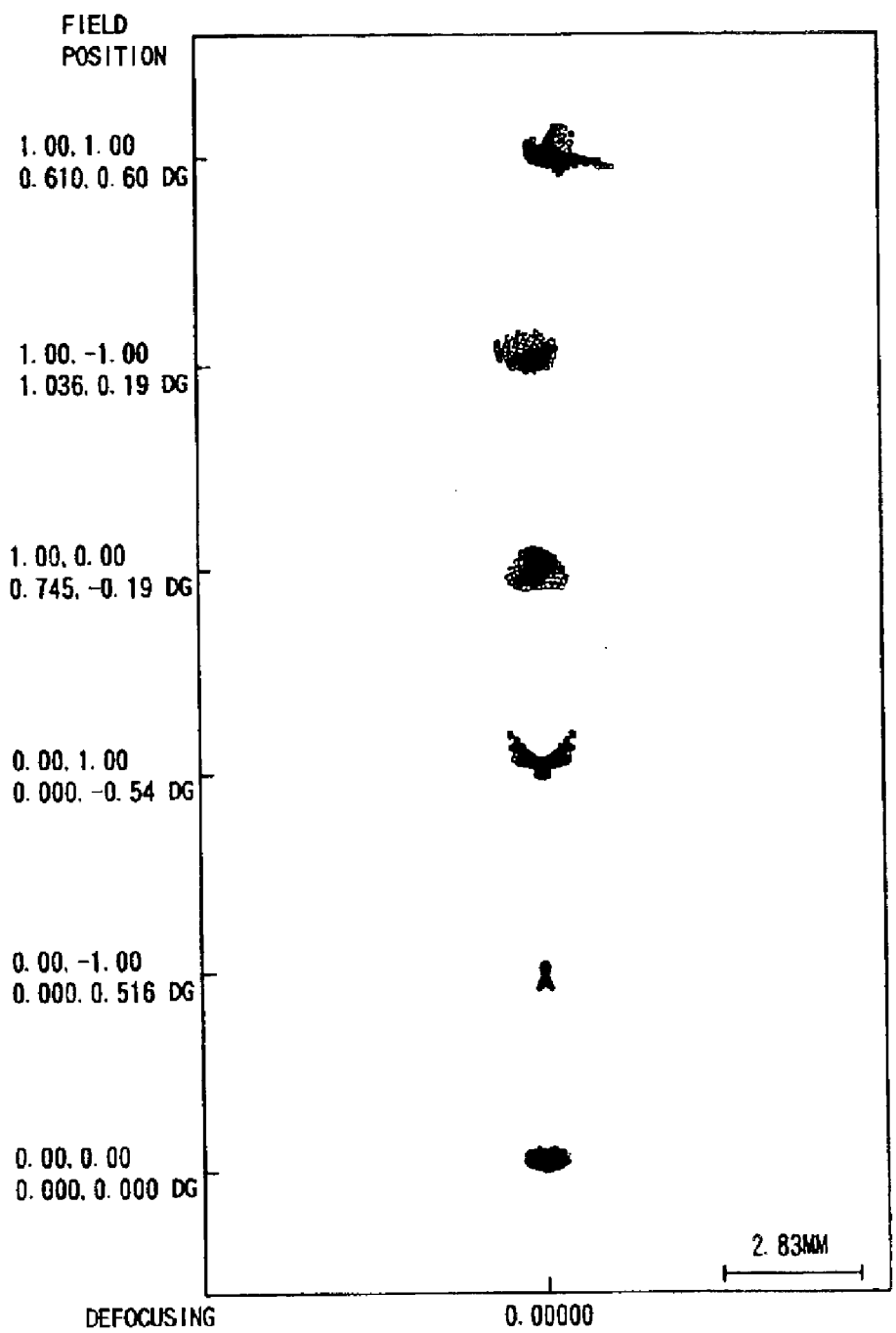
FIG. 3 is a spot diagram of the projection optical system shown in FIG. 1.
Figure 4:
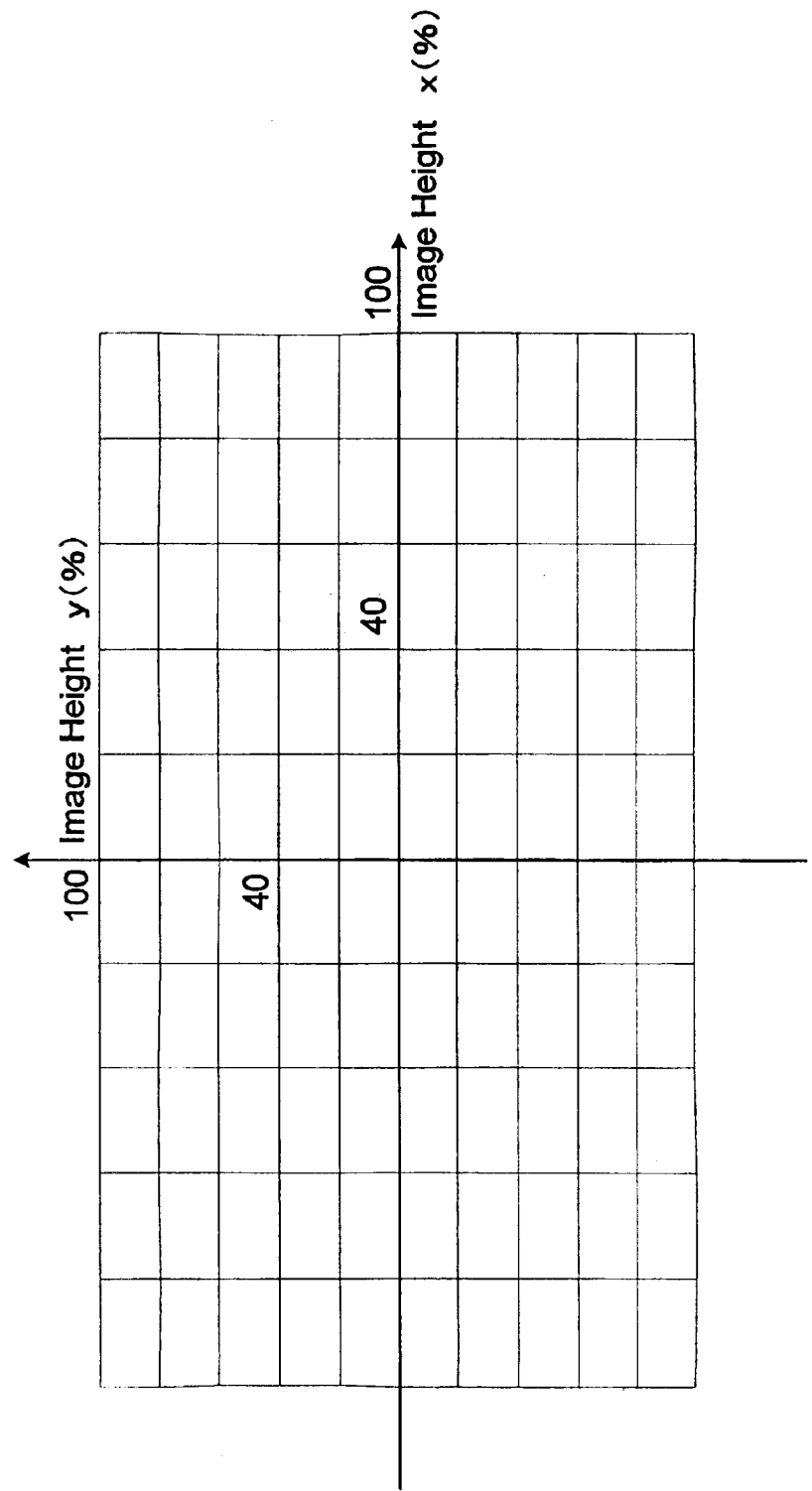
FIG. 4 shows distortion of the projection optical system shown in FIG. 1.

FIG. 3 shows a spot diagram of the projection optical system K1 in Embodiment 1, while FIG. 4 shows distortion. The spot diagram shows image forming performance on the screen S for luminous flux at a wavelength of 643.85 mm. The projection optical system K1 in Embodiment 1 is composed only of the reflecting surfaces and no chromatic aberration occurs, so that FIG. 3 shows the spot diagram for light at only one wavelength.

On the other hand, the distortion diagram shows image height positions on the screen S corresponding to rectangular elements of a matrix on the image forming element P. The image height at 100% in the vertical axis (y) direction corresponds to the position of 498 mm from the center of the projected image in the vertical direction, while the image height at 100% in the horizontal axis (x) direction corresponds to the position of 855 mm from the center of the projected image in the horizontal direction.

(Embodiment 2)

Figure 5:
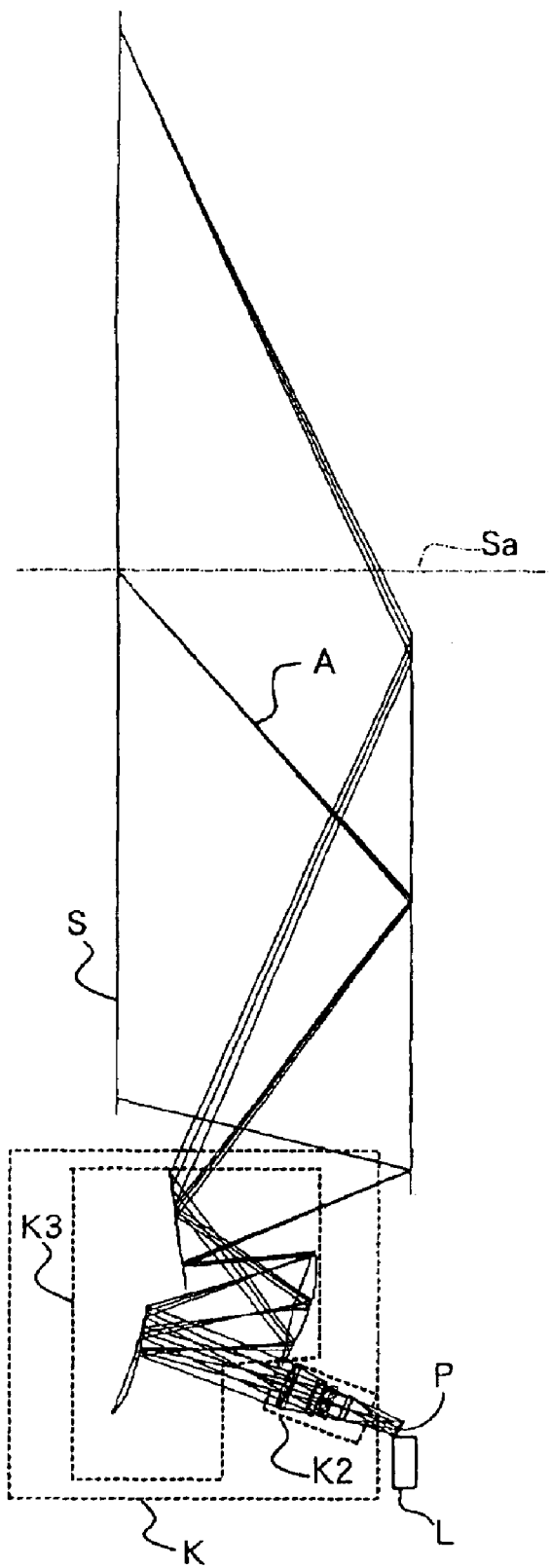
FIG. 5 is a schematic diagram showing the structure of all optical systems of a projector which is Embodiment 2 of the present invention.
Figure 6:
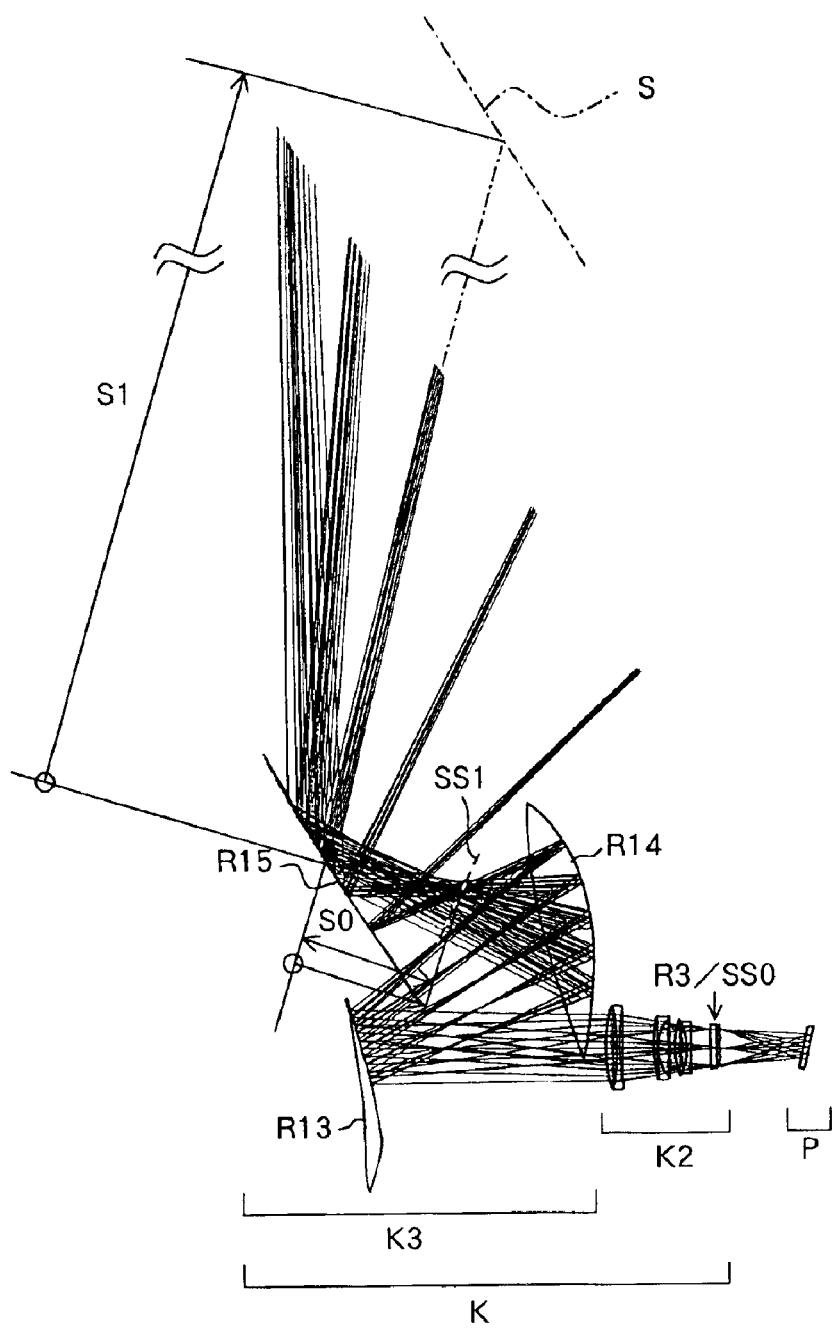
FIG. 6 is a schematic diagram showing the structure of a projection optical system of the optical systems shown in FIG. 5.

FIG. 5 is a schematic diagram showing main portions of all optical systems of a projector employing a projection optical system which is Embodiment 2 of the present invention. FIG. 6 is an enlarged view of the projection optical system.

In FIGS. 5 and 6, P shows an image forming element for which a reflective type dot matrix liquid crystal display, a digital micromirror device or the like can be used.

L shows an illumination optical system which illuminates the image forming element P. The illumination system L is formed of a lamp, a condenser lens, a filter for selecting a wavelength or the like.

K shows the projection optical system which guides light modulated by the image forming element P to a screen S and forms an image on the screen S. The projection optical system K is formed of a refractive optical system K2 which includes a plurality of off-axial refractive lenses and a reflective optical system K3 which employs the off-axial optical system, in order from the image forming element P.

The reflective optical system K3 includes a plurality of rotationally asymmetrical reflecting surfaces each having a curvature.

Specifically, as shown in FIG. 6 the reflective optical system K3 is composed of three reflecting surfaces including a convex mirror R13, a concave mirror R14, and a convex mirror R15, in the order in which rays from the image forming element P pass through. In the reflective optical system K3, all the reflecting surfaces are symmetrical only with respect to the YZ plane, and the convex mirror R13 is shifted by 25 mm in the y axis direction.

The image at an aperture stop SS0 is focused at a position SS1 between the concave mirror R14 and the convex mirror R15. In other words, a pupil surface (that is, an intermediate image of the image forming element P) is formed at a position (hereinafter referred to as "a pupil image forming position") between the aperture stop SS0 and the convex mirror R15 which is an optical surface having a curvature through which the rays traveling from the image forming element P to the screen S pass last.

The projection optical system K is not formed only of the rotationally asymmetric reflecting surfaces but includes the off-axial refractive optical system K2 is in this manner. Thus, the optical power can be provided by the off-axial refractive optical system K2 as well as the reflective optical system K3, thereby making it possible to reduce the number of the rotationally asymmetrical surfaces which involve high cost. In addition, since the optical power for each of the rotationally asymmetrical surfaces is reduced, an allowance for errors in manufacture can be increased.

The concave mirror R14 which is the first reflecting surface counting from the pupil image forming position SS1 toward the image forming element P has a positive optical power, while the convex mirror R15 which is the first reflecting surface counting from the pupil image forming position SS1 toward the screen S has a negative optical power. This can reduce the distance from the image forming element P to the pupil image forming position SS1 and the distance from the pupil image forming position SS1 to the screen S, so that the projection distance can be more reduced.

In the projection optical system K, the aforementioned expression (1) is preferably satisfied in order to provide a shorter projection distance and suppress an increase in the diameter of the optical surface closer to the screen S.

In Embodiment 2, S0 is equal to 43.0, S1 831, and β 69.1, and thus the following is obtained:

$$(S0 \times |\beta|)/S1 = 3.58$$

In Embodiment 2, the image forming element P has dimensions of 14 mm in the vertical direction and 19 mm in the horizontal direction. The screen S has dimensions of 966 mm in the vertical direction and 1314 mm in the horizontal direction. The magnification β in the oblique projection direction is 69.15.

A normal line Sa to the screen S is inclined by 50.9 degrees toward a reference axis A. In the following, data for representing the projection optical system K used in Embodiment 2 is shown. In the data, each surface is designated with a number i (i is a positive integer) in the order from the image forming element P to the screen S. Each of symbols in the data has a meaning described above.

| Object Side Aperture Value 0.21 | | | | | | |
|---|---|---|---|---|---|---|
| i | Yi | Zi | θi | Di | Ni | νi |
| 1 | −10.45 | 50.18 | −12.00 | 0.10 | 1 | aperture |
| 2 | −10.47 | 50.28 | −12.00 | 6.00 | 1.85504 | 0.00 refracting surface |
| 3 | −11.72 | 56.15 | −12.00 | 11.46 | 1 | refracting surface |
| 4 | −14.10 | 67.36 | −12.00 | 2.00 | 1.76859 | 0.00 refracting surface |
| 5 | −14.52 | 69.31 | −12.00 | 7.52 | 1.48915 | 0.00 refracting surface |
| 6 | −16.08 | 76.67 | −12.00 | 0.10 | 1 | refracting surface |
| 7 | −16.52 | 78.73 | −12.00 | 10.00 | 1.48915 | 0.00 refracting surface |
| 8 | −18.18 | 86.55 | −12.00 | 2.00 | 1.76859 | 0.00 refracting surface |
| 9 | −18.60 | 88.51 | −12.00 | 19.84 | 1 | refracting surface |
| 10 | −22.72 | 107.91 | −12.00 | 1.90 | 1.65222 | 0.00 refracting surface |
| 11 | −23.12 | 109.77 | −12.00 | 6.36 | 1.85504 | 0.00 refracting surface |
| 12 | −24.44 | 116.00 | −12.00 | 135.84 | 1 | refracting surface |
| 13 | −77.14 | 243.67 | −24.00 | 156.11 | 1 | reflecting surface |
| 14 | 42.95 | 137.96 | −18.00 | 150.00 | 1 | reflecting surface |
| 15 | 39.23 | 287.96 | −44.60 | 350.00 | 1 | reflecting surface |
| 16 | 389.20 | 283.02 | −37.19 | 438.55 | 1 | reflecting surface |
| 17 | 501.28 | 707.01 | −37.19 | 0.00 | 1 | reflecting surface |
| 18 | 501.28 | 707.01 | −37.19 | | 1 | image surface |

| Spherical Shape | |
|---|---|
| R 2 surface | r 2 = 51.550 |
| R 3 surface | r 3 = 799.180 |
| R 4 surface | r 4 = −371.002 |
| R 5 surface | r 5 = 35.660 |
| R 6 surface | r 6 = −49.426 |
| R 7 surface | r 7 = 333.809 |
| R 8 surface | r 8 = −26.698 |
| R 9 surface | r 9 = −75.896 |
| R 10 surface | r10 = −144.207 |
| R 11 surface | r11 = 220.204 |
| R 12 surface | r12 = −86.830 |

Aspheric Shape

R13 surface

C02 = 1.56917e−003　C20 = 1.18915e−003
C03 = −2.54018e−005　C21 = −1.87725e−005
C04 = 3.93797e−007　C22 = 7.81221e−007　C40 = 1.27036e−007
C05 = −1.42359e−009　C23 = −9.62848e−009　C41 = −3.95620e−009
C06 = −5.96310e−012　C24 = 3.85809e−011　C42 = 1.70824e−011
C60 = 1.96716e−011

R14 surface

C02 = 3.10814e−003　C20 = 4.57287e−003
C03 = 1.21999e−005　C21 = 1.92043e−005
C04 = 4.80365e−008　C22 = 1.23036e−007　C40 = 2.93548e−008
C05 = 9.37615e−010　C23 = 1.45812e−009　C41 = 4.43416e−010
C06 = 3.19557e−012　C24 = 2.07844e−012　C42 = −1.33848e−012
C60 = −8.77205e−013

R15 surface

C02 = −4.75238e−004　C20 = −1.11111e−004
C03 = −5.56000e−008　C21 = −3.15944e−006
C04 = 1.51670e−008　C22 = 2.76942e−008　C40 = −3.22758e−009
C05 = −2.32814e−010　C23 = −2.14547e−011　C41 = 1.18082e−010
C06 = 1.23430e−012　C24 = −1.64855e−012　C42 = −1.30829e−012
C60 = −1.98888e−013

Next, optical effects in the projection optical system K in Embodiment 2 are described. Light emitting from a light source of the illumination optical system L passes through a condenser lens, a color filter and the like, not shown, illuminates the image forming element P. The light modulated by the image forming element P first passes through the refractive optical system K2 constituting part of the projection optical system K, and then travels while it is sequentially reflected by the three reflecting surfaces (R14 to R16). The light is then guided to the screen S where a projection image is enlargingly projected corresponding to the original image displayed on the image forming element P.

Figure 7:
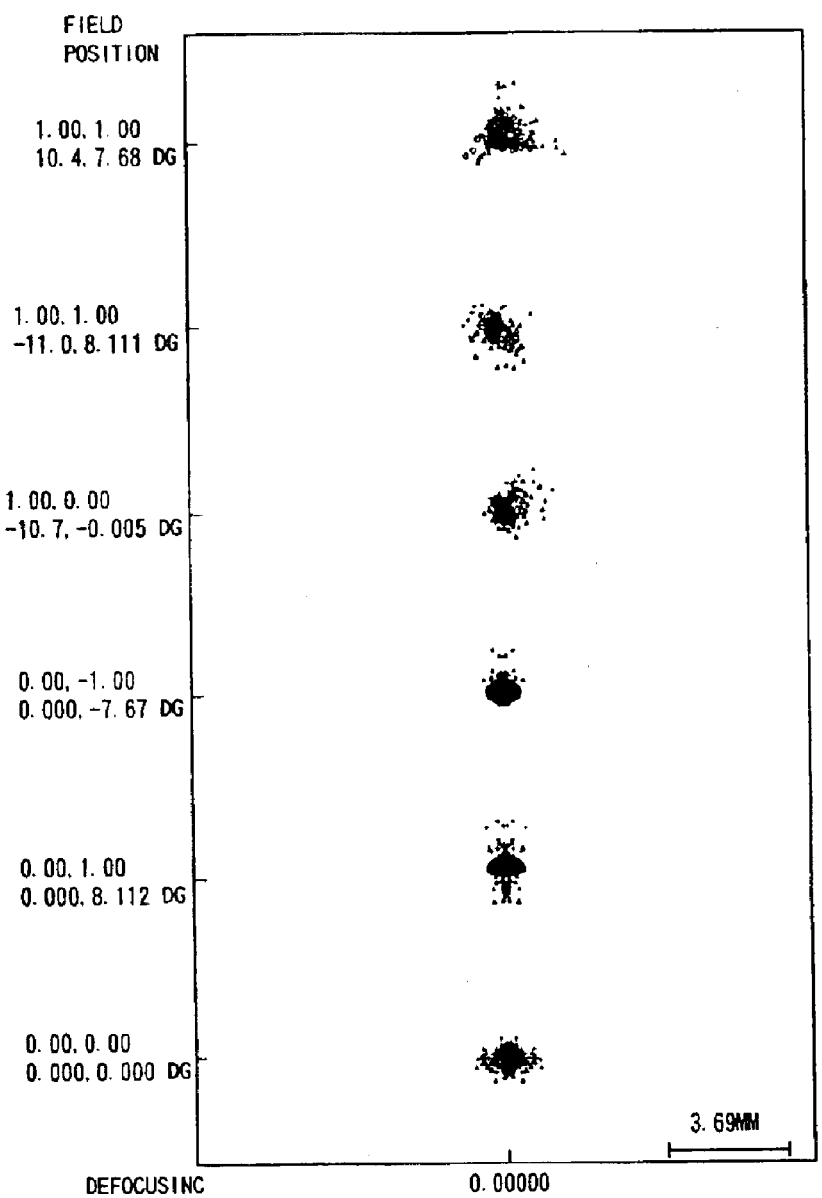
FIG. 7 is a spot diagram of the projection optical system shown in FIG. 5.
Figure 8:
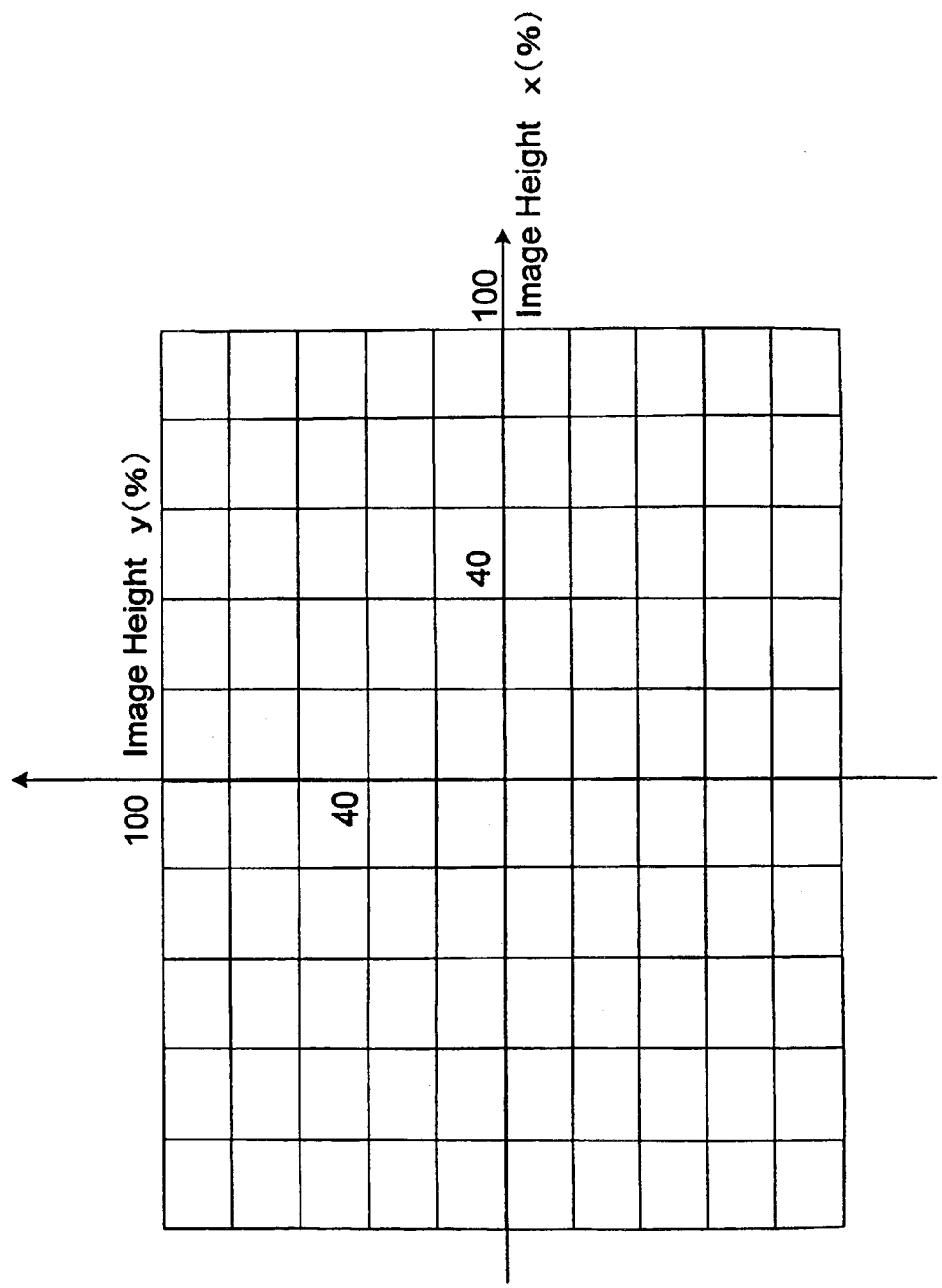
FIG. 8 shows distortion of the projection optical system shown in FIG. 5.
Figure 9:
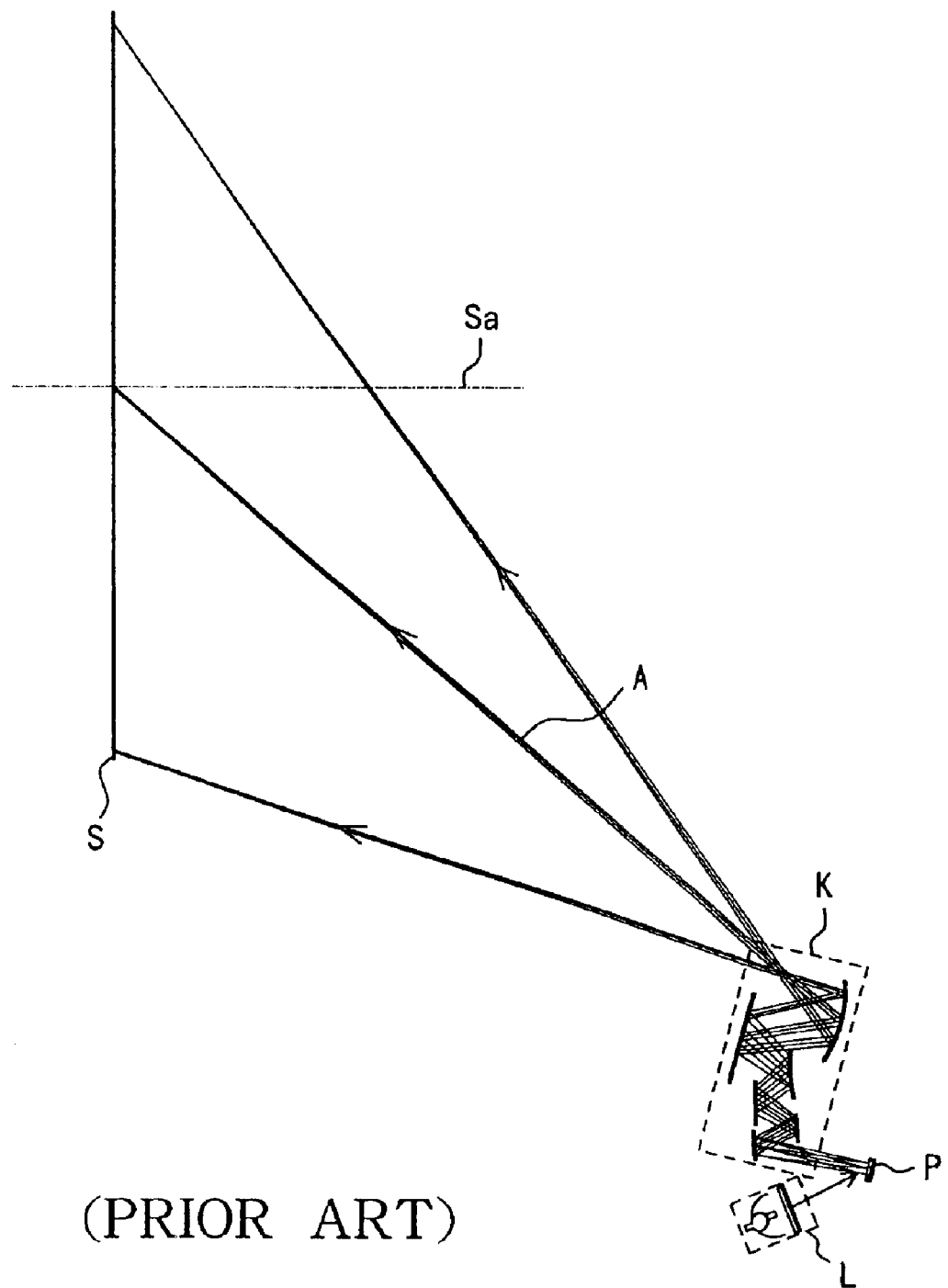
FIG. 9 is a schematic diagram showing the structure of a conventional oblique projection optical system.
Figure 10:
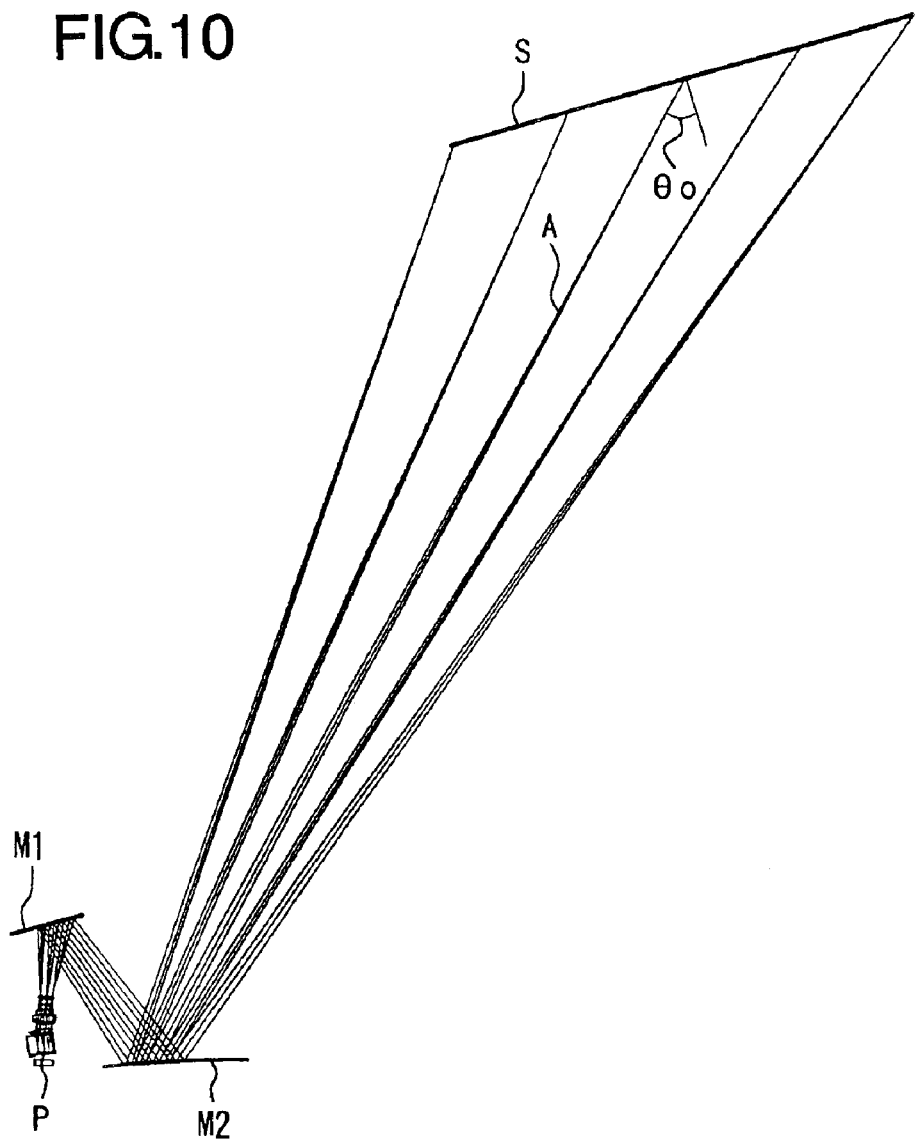
FIG. 10 is a schematic diagram showing the structure of a conventional oblique projection optical system.

FIG. 7 shows a spot diagram of the projection optical system K in Embodiment 2, while FIG. 8 shows distortion. The spot diagram shows image forming performance on the screen S for luminous flux at wavelengths of 643.85 mm (shown by Δ), 546.07 mm (shown by ○), and 435.83 mm (shown by +).

On the other hand, the distortion diagram shows image height positions on the screen S corresponding to rectangular elements of a matrix on the image forming element P. The image height at 100% in the vertical axis (y) direction corresponds to the position of 966 mm from the center of the projected image in the vertical direction, while the image height at 100% in the horizontal axis (x) direction corresponds to the position of 1314 mm from the center of the projected image in the horizontal direction.

Table 1 below shows the values of S0, S1, β, and ((S0×|β|)/S1) in Embodiments 1 and 2 (represented as Examples 1 and 2 in Table 1).

TABLE 1

| | S0 | S1 | β | (S0 × |β|)/S1 |
|---|---|---|---|---|
| Example 1 | 46.1 | 1046 | 40 | 1.76 |
| Example 2 | 43 | 831 | 69.1 | 3.58 |

The upper limit in the expression (1) may be decreased to satisfy the following expression (1)':

$$0 < (S0 \times |\beta|)/S1 < 5 \qquad (1)'$$

It is possible to further reduce the projection distance and the diameter of the optical surface closer to the screen S by satisfying the expression (1)'.

It should be noted that the number of the reflecting surfaces constituting the projection optical system of the present invention is not limited to those in Embodiments 1 and 2. When the refractive optical element is included in the projection optical system as in Embodiment 2, the number of the refractive optical elements is not limited to that in Embodiment 2.

While the plane including the central principal ray passing through the aforementioned plurality of reflecting surfaces (which have refractive power) is perpendicular to the screen (the projection surface) in Embodiments 1 and 2, this is not essential. Specifically, the plane including the central principal ray may be substantially parallel to the screen. Alternatively, the normal line to the image display surface of the image forming element (a known image display device such as a transmission type liquid crystal panel, a reflective type liquid crystal panel, and a DMD) may be perpendicular to the normal line to the screen.

In such a case, a reflective member such as a plane mirror with no optical power can be used between the screen and the final reflecting surface (the surface closest to the screen having optical power) among the plurality of reflecting surfaces to direct the optical path of the central principal ray toward the screen. This enables the optical path to be bent while the characteristics of the present invention are maintained, thereby achieving a further reduction in size and thickness of the whole apparatus. Preferably, two or three plane mirrors may be used.

The use of the projection optical system of the present invention is not limited to the projection type image display apparatus which uses a liquid crystal display element or a digital micromirror device as in Embodiments 1 and 2. The projection optical system is applicable to an image display apparatus which uses another image forming element such as a self-luminous element (for example, an organic electroluminescence element).

As described above, according to each of Embodiments 1 and 2, it is possible to realize the projection optical system for oblique projection which achieves a high magnification, a short projection distance, and excellent performance while the optical system is made compact in size.

While preferred embodiments have been described, it is to be understood that modification and variation of the present invention may be made without departing from the scope of the following claims.

What is claimed is:

1. A projection optical system which provides a final image of an original image formed by an image forming element on a final image plane, the projection optical system comprising:

a plurality of reflecting surfaces, each of the surfaces having a curvature, wherein a central principal ray, which is a principal ray of luminous flux traveling from a center of the original image to a center of the final image, enters obliquely on the final image plane, and the projection optical system forms an intermediate image of the original image between the original image and the final image in a path of the central principal ray, and a final pupil plane, which is closest to the final image plane of a plurality of pupil planes being between the original image and the final image, is arranged on the original image side with respect to a final reflecting surface, which is closest to the final image plane of the plurality of reflecting surfaces, and the following expression is satisfied:

$$0<(S0\times|\beta|)/S1<8$$

where S0 represents a length of a path of the central principal ray from the final pupil plane to the final reflecting surface, S1 represents a length of a path of the central principal ray from the final image plane to the final image plane, and $\beta$ represents a magnification of the final image with respect to the original image in a plane including a normal to the final image plane and the central principal ray entering on the final image plane.

2. The projection optical system according to claim 1, wherein further the following expression is satisfied:

$$0<(S0\times|\beta|)/S1<5.$$

3. The projection optical system according to claim 1, wherein the reflecting surfaces are rotationally asymmetric surfaces.

4. The projection optical system according to claim 1, further comprising:

at least one optical element having a refractive power.

5. A projection type image display apparatus comprising:

an image forming element which forms an original image; and the projection optical system according to claim 1.

6. The projection type image display apparatus according to claim 5, further comprising a plane reflecting surface on an optical path from the projection optical system to the final image plane.

7. An image display system comprising:

the projection type image display apparatus according to claim 5; and an image information supply apparatus which supplies image information for displaying an original image on the image forming element to the projection type image display apparatus.

8. A projection optical system which provides a final image of an original image formed by an image forming element on a final image plane, the projection optical system comprising:

a plurality of reflecting surfaces, each of the surfaces having a curvature; and an aperture stop, wherein a central principal ray, which is a principal ray of luminous flux traveling from the center of the original image to a center of the final image, enters obliquely on the final image plane, and the projection optical system forms an intermediate image between the original image and the final image in a path of the central principal ray, and the aperture stop is disposed closer to the image forming element than a final reflecting surface closest to the final image plane of the plurality of reflecting surfaces and an image of the aperture stop is formed between the aperture stop and the final reflecting surface.

9. The projection optical system according to claim 8, wherein the reflecting surfaces are rotationally asymmetric surfaces.

10. The projection optical system according to claim 8, further comprising:

at least one optical element having a refractive power.

11. The projection optical system according to claim 8, wherein, among the plurality of reflecting surfaces, at least one of reflecting surfaces through which luminous flux from the position where the image of the aperture stop is formed in the projection optical system to the final image plane passes has a negative optical power.

12. The projection optical system according to claim 8, wherein, among the plurality of reflecting surfaces, a first reflecting surface counting from the position where the image of the aperture stop is formed toward the image forming element has a positive optical power, and a first reflecting surface counting from the position where the image of the aperture stop is formed toward the final image plane has a negative optical power.

13. The projection optical system according to claim 8, wherein a normal line to the image forming element substantially forms an angle of 90 degrees with a normal line to the final image plane.

14. A projection type image display apparatus comprising:

an image forming element which forms an original image; and the projection optical system according to claim 8.

15. The projection type image display apparatus according to claim 14, further comprising a plane reflecting surface on an optical path from the projection optical system to the final image plane.

16. An image display system comprising:

the projection type image display apparatus according to claim 14; and an image information supply apparatus which supplies image information for displaying an original image on the image forming element to the projection type image display apparatus.

17. A projection optical system which provides a final image of an original image formed by an image forming element on a final image plane, the projection optical system comprising:

an aperture stop, wherein a central principal ray, which is a principal ray of luminous flux traveling from the center of the original image to the center of the final image, enters obliquely on the final image plane, the projection optical system forms an intermediate image of the original image between the original image and the final image in a path of central principal ray, and an aperture stop is disposed closer to the image forming element than the final reflecting surface closest to the final image plane of a plurality of reflecting surfaces and an image of the aperture stop is formed between the aperture stop and the final reflecting surface.

18. A projection type image display apparatus comprising:

an image forming element which forms an original image; and the projection optical system according to claim 17.

19. An image display system comprising:

the projection type image display apparatus according to claim 18; and an image information supply apparatus which supplies image information for displaying an original image on the image forming element to the projection type image display apparatus.

* * * * *

UNITED STATES PATENT AND TRADEMARK OFFICE
CERTIFICATE OF CORRECTION

PATENT NO. : 6,951,395 B2
DATED : October 4, 2005
INVENTOR(S) : Sawako Chatani et al.

It is certified that error appears in the above-identified patent and that said Letters Patent is hereby corrected as shown below:

Column 13,
Line 63, delete "ray from the final image plane" and insert -- ray from the final pupil plane --.

Column 14,
Line 35, delete "from the center" and insert -- from a center --.
Line 39, insert -- of the original image -- before "between the original image".

Column 16,
Line 5, insert -- the -- before "central principle ray".
Line 7, delete "an aperture stop" and insert -- the aperture stop --.
Line 8, delete "element than the final" and insert -- element than a final --.

Signed and Sealed this

Thirteenth Day of December, 2005

JON W. DUDAS
*Director of the United States Patent and Trademark Office*